US008676172B2

(12) United States Patent
Farkas et al.

(10) Patent No.: US 8,676,172 B2
(45) Date of Patent: Mar. 18, 2014

(54) GENERATING RELATIONAL INDICATORS BASED ON ANALYSIS OF TELECOMMUNICATIONS EVENTS (75) Inventors: Lorant Farkas, Budapest (HU); Gyorgy Csefan, Gyula (HU); Jozsef Dombi, Szeged (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/379,091

(22) PCT Filed: Jun. 29, 2009

(86) PCT No.: PCT/EP2009/058096
§ 371 (c)(1),
(2), (4) Date: Feb. 8, 2012

(87) PCT Pub. No.: WO2011/000404
PCT Pub. Date: Jan. 6, 2011

(65) Prior Publication Data
US 2012/0129505 A1 May 24, 2012

(51) Int. Cl.
*H04M 3/42* (2006.01)
*H04W 4/00* (2009.01)
*G10L 21/00* (2013.01)

(52) U.S. Cl.
USPC ............... 455/414.1; 455/456.1; 704/206

(58) Field of Classification Search
USPC ............. 455/414.1–414.4, 415, 412.1, 413, 455/456.1–457; 704/200; 379/265.06–265.07
See application file for complete search history.

(56) References Cited

U.S. PATENT DOCUMENTS

| 5,040,988 | A | 8/1991 | Brown |
| 6,064,383 | A | 5/2000 | Skelly |
| 2004/0186717 | A1* | 9/2004 | Savic et al. ............... 704/256 |
| 2004/0204142 | A1 | 10/2004 | Chen |
| 2004/0249634 | A1* | 12/2004 | Degani et al. ............. 704/207 |
| 2005/0010411 | A1 | 1/2005 | Rigazio et al. |
| 2006/0129927 | A1* | 6/2006 | Matsukawa ............... 715/532 |
| 2006/0148502 | A1* | 7/2006 | Korneluk et al. ......... 455/518 |
| 2006/0173957 | A1 | 8/2006 | Robinson et al. |
| 2006/0250361 | A1 | 11/2006 | Chang |
| 2006/0262920 | A1* | 11/2006 | Conway et al. ........ 379/265.02 |
| 2007/0071206 | A1* | 3/2007 | Gainsboro et al. ......... 379/168 |
| 2007/0087810 | A1* | 4/2007 | Walker et al. ............... 463/16 |
| 2008/0256170 | A1* | 10/2008 | Hayashi et al. ............ 709/201 |

FOREIGN PATENT DOCUMENTS

| WO | WO 01/16939 A1 | 3/2001 |
| WO | WO 03/015079 A1 | 2/2003 |
| WO | WO 03/050645 A2 | 6/2003 |
| WO | WO 2006/124945 A1 | 11/2006 |

OTHER PUBLICATIONS

International Search Report and Written Opinion Corresponding to International Application No. PCT/EP2009/058096 dated Mar. 5, 2010.

* cited by examiner

*Primary Examiner* — Vladimir Magloire
*Assistant Examiner* — Michael Mapa
(74) *Attorney, Agent, or Firm* — Squire Sanders (US) LLP (57) ABSTRACT

A system for generating a relational indicator based on analysis of at least one telecommunications event between a first party and a second party, comprises: a relation management engine which is configured to process first content characteristics extracted from a plurality of telecommunications events to produce a first relation parameter and to process second content characteristics extracted from the plurality of telecommunications events to produce a second relation parameter; a terminal device configured to use the first and second relation parameters to generate the relational indicator.

27 Claims, 4 Drawing Sheets

GENERATING RELATIONAL INDICATORS BASED ON ANALYSIS OF TELECOMMUNICATIONS EVENTS

This invention relates to a method of generating a relational indicator based on analysis of a plurality of telecommunications events between parties. It is particularly, but not exclusively, related to analysis of the contents of telephone calls and text-containing messages between individuals. In one embodiment it is related to the display in graphical form of such analysis.

These days, people tend to use a variety of devices for telecommunications purposes, for example mobile terminals, personal computers, and devices which support Internet-based services. As a result, an individual may have contact information stored on a plurality of devices. Contact management is important to users of telecommunications devices and is becoming more so as the number of contacts grows over time. Additionally new services, such as those provided by social networking portals, generate new types of contact information. Therefore, it is not unusual for an individual to need to maintain several independent contact lists in different devices relating to different applications and services.

With a potentially large number of contacts and several independent contact lists it becomes more difficult for the individual to keep track of their contact information.

WO2006124945 relates to a method of separating and data-mining voice data in a phone call and applying a linguistic-based behavioural model.

US20060173957 relates to a method of extracting social networks from messages and relationships evolution based on a time-based model. This can be based on the recipients to whom messages are sent and traffic patterns.

US20060250361 relates to a system and method in which light emitting diodes are used on a mouse to display a user's emotions.

U.S. Pat. No. 6,064,383 relates to a user interface element which is able to select an appearance for a graphical character corresponding to an emotional intensity.

U.S. Pat. No. 5,040,988 relates to a method in which moods are presented on a panel or display board by means of illuminated lamps or pegs.

US20040204142 relates to a method in which mobile phones are able to show the mood of their owner based on a calendar and horoscope-based mood index database.

WO200350645 relates to a system and method for mood messaging in which various formats can be selected indicative of a mood.

According to a first aspect of the invention there is provided a method of generating a relational indicator based on analysis of at least one telecommunications event between a first party and a second party, comprising the steps of: extracting first content characteristics from the at least one telecommunications event and processing them to produce a first relation parameter;

extracting second content characteristics from the at least one telecommunications event and processing them to produce a second relation parameter; and using the first and second relation parameters to generate the relational indicator.

Preferably, the method operates on a first set of content characteristics and a second set of content characteristics.

Preferably, the first content characteristics are extracted from a plurality of telecommunications events and are processed to produce the first relation parameter. Preferably, the second content characteristics are extracted from a plurality of telecommunications events and are processed to produce the second relation parameter.

Preferably, first and second relational sub-indicators are generated, one in respect of the first party and another in respect of the second party. The relational sub-indicators may be combined in a way in which they can be viewed simultaneously.

In one embodiment the relational indicator is in a graphical form. The relational sub-indicator(s) may have a neutral state in which the relation parameters are at mid-levels. As they deviate from these mid-levels, the neutral state may be disturbed, for example in terms of introducing to at least one of the relational sub-indicators a waveform-like periphery, an apparent movement, or a size change, for example a dynamic size change to provide an apparent pulsing effect.

The relational indicator may be representative of the relation parameters existing in the form of numerical values. These values may be indicative of emotional states. In one embodiment of the invention, the emotional states comprise two or more of anger, happiness, and trust. Accordingly, the relational indicator may be representative of an aggregation of various relation parameters.

The relational indicator may enable a party to readily determine the overall relational situation between the first part and the second party. In general, it may indicate the disposition of one party to another or the disposition between parties.

Preferably, the relation parameters are derived from the plurality of telecommunications events between the first party and the second party over a period of weeks, months, or even years. Accordingly, the relational indicator may be configured to represent a relationship between the first and second parties, taken as the form of an average over a defined period of time such as a week, a month, or a year. Sequential relational indicators may be presented so that the development of the relationship between the parties over a period of time may be observed. These may indicate states of the relationship covering discrete periods in the past.

Preferably, the first and second content characteristics may have content characteristics in common.

There may be more than two relation parameters generated. In a preferred embodiment, three relation parameters are generated.

Preferably, the first and second content characteristics are extracted within a first network element. In one embodiment they are extracted in a media gateway. In another embodiment, they are extracted in an intelligent voice mailbox. The first network element may process the content characteristics to produce the relation parameters or may pass them on to a second network element, for example a relationship management engine, which produces them. The first or second network element may use the relation parameters to generate the relational indicator. The relational indicator, or an identifier which identifies the relational indicator, may be sent to a terminal device at which the relational indicator can be displayed. Alternatively, the relation parameters may be sent to a terminal device which uses them to generate the relational indicator.

In another embodiment of the invention, the first and second content characteristics are extracted within a terminal device. In such a case, the terminal device may send the extracted content characteristics, or data derived from them, to a network element to produce the relation parameters.

Preferably, the first party is a user of a terminal device containing a contacts list. Preferably, the contacts list contains a contact representing the second party. Preferably, the relational indicator is displayed at the first terminal device in association with the contact. There may be a number of respective relational indicators associated with a number of contacts in the contacts list.

Preferably, the terminal device is a mobile terminal device. In such a case, the network element is present within a mobile communications network. However, the invention is not limited to mobile communications and the terminal device may be a device configured to work with a fixed telecommunications network.

Preferably, the telecommunications event is a voice call between the first party and the second party. Alternatively, it is a text-based message from one party to another. In the former case, the content characteristics are speech characteristics. The speech characteristics may be aspects of prosody present in speech. They may be indications of stress within the speech, derivable from assessment of pitch, indications of engagement in a call, and/or indications of one party being relatively dominant during the call.

According to a second aspect of the invention there is provided a system for generating a relational indicator based on analysis of at least one telecommunications event between a first party and a second party, comprising:

a relation management engine configured to process first content characteristics extracted from the at least one telecommunications event to produce a first relation parameter and to process second content characteristics extracted from the at least one telecommunications event to produce a second relation parameter;

a terminal device configured to use the first and second relation parameters to generate the relational indicator.

Preferably, the system has an event database to store data related to the telecommunications event. Preferably, the system has a mood database to store data related to emotions which has been derived from event-related data.

According to a third aspect of the invention there is provided a network element configured to generate first and second relation parameters to be provided to a terminal device which is configured to use the first and second relation parameters to generate a relational indicator, the network element being configured to process first content characteristics extracted from at least one telecommunications event to produce the first relation parameter and to process second content characteristics extracted from the at least one telecommunications event to produce the second relation parameter.

According to a fourth aspect of the invention there is provided a terminal configured to receive first and second relation parameters from a network element and to use the first and second relation parameters to generate a relational indicator, the first relation parameter having been produced as a result of processing by the network element of first content characteristics extracted from at least one telecommunications event and the second relation parameter having been produced as a result of processing by the network element of second content characteristics extracted from the at least one telecommunications event.

According to a fifth aspect of the invention there is provided a computer program product comprising software code that when executed on a computing system performs a method of generating a relational indicator based on analysis of at least one telecommunications event between a first party and a second party, comprising the steps of:

extracting first content characteristics from the at least one telecommunications event and processing them to produce a first relation parameter;

extracting second content characteristics from the at least one telecommunications event and processing them to produce a second relation parameter; and using the first and second relation parameters to generate the relational indicator.

Preferably, the computer program product has executable code portions which are capable of carrying out the steps of the method.

Preferably, the computer program product is stored on a computer-readable medium.

An embodiment of the invention will now be described, by way of example only, with reference to the accompanying drawings in which.

Figure 1:
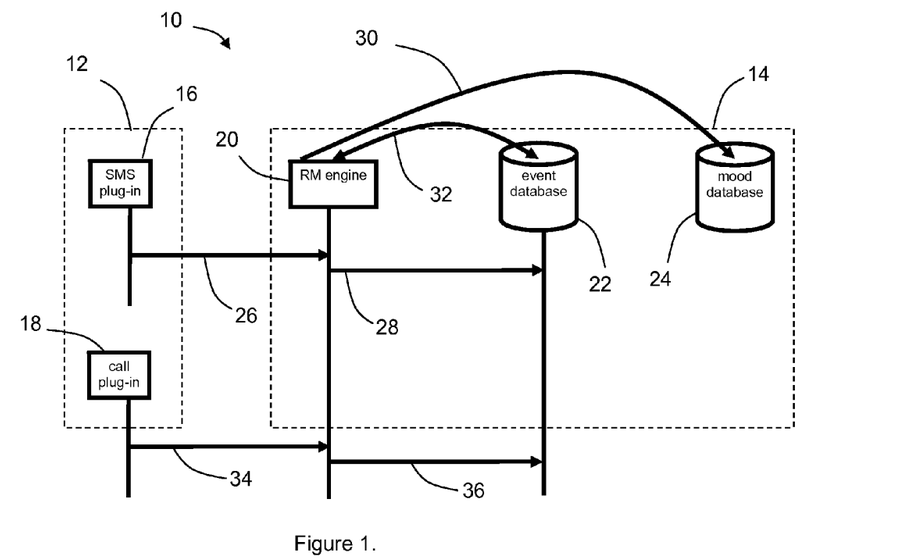
FIG. 1 shows a system for collecting data and generating a relational indicator.

FIG. 1 shows a system 10 for collecting and processing data and generating a relational indicator based on analysis of a plurality of telecommunications events between a first party and a second party. The system comprises a mobile terminal 12 used by a user (user A) and a network 14.

The mobile terminal 12 has a client which incorporates various software modules including a short messaging service (SMS) plug-in 16 and a call plug-in 18. The mobile terminal 12 is capable of wireless communications with the network 14 in a conventional manner. It may be a cellular mobile terminal capable of communicating with a cellular network, for example one compatible with the GSM (Global System for Mobile communications) system, or it may be a local area network (for example a wireless local area network (WLAN)) mobile terminal capable of communicating with a WLAN access point and, from there, the Internet.

The network 14 comprises a relationship management (RM) engine 20 connected to an event database 22 and to a mood database 24.

The mobile terminal 12 and the network 14 communicate over an air interface via radio connectivity provided by a radio access network (not shown).

The call plug-in 18 analyses the speech of calls as they are made. During the call setup phase of a call when a connection is established, the call plug-in 18 obtains respective MSISDNs of the user A and a mobile terminal user at the other end of the connection (user B). During the call, the call plug-in 18 in the mobile terminal 12 is readily able to discriminate whether a particular part of the call relates to speech of the user A or the user B. In respect of the call, the call plug-in 18 analyses the speech, for example aspects of prosody and flow of speech in the call, to extract various speech characteristics in relation both to the incoming and outgoing parts of the call, including:

pitch of the speech in the call;

speech to silence ratio;

frequency of speaker exchange; and ratio of speech period of a first and a second speaker.

As a result of this extraction, the call plug-in 18 produces a data package including an analysis of the call in relation both to the incoming and outgoing parts of the call in the form of a data table of the speech characteristics and the MSISDNs of the user and the called party. After the call is complete, the call-plug-in 18 sends the data package to the RM engine 20 in a message 26. In an alternative embodiment, the call plug-in 18 sends the data package, or a series of data packages, during the call.

In this embodiment, the mobile terminal 12 is extracting speech characteristics from both originating and terminating calls as far as it is concerned. In the case in which the mobile terminal at the other end of the connection is configured to operate this service and is also provided with its own call plug-in 18, that mobile terminal might also provide a data package to the RM engine 20. In this case, the RM engine 20 would be provided with a pair of data packages relating to the same event each relating to both to the incoming and outgoing parts of the call. However, it is sufficient for the RM engine 20 to receive only one data package. To deal with this, suitable functionality within the network can communicate with the mobile terminals so that only one mobile terminal sends a data package, the RM engine 20 can discard one of the data packages, or both can be stored and both used by the RM engine 20. Alternatively, the call plug-ins at each end may only extract speech characteristics from local speech, for example by using the signal fed into the microphone at each mobile terminal, and separately provide extracted speech characteristics to the RM engine 20 which takes these separate parts and merges them to have data relating to both ends of the call.

In another embodiment of the invention, the pair of data packages (that is two sets of raw data) which are generated during communication between first and second terminal devices, one package in respect of speech analysis within the first terminal device, and the other package in respect of speech analysis within the second terminal device, are handled differently. Each package contains data in respect of both callers. Additional information in respect of the call can be generated by comparing the packages, possibly by comparing speech characteristics obtained in respect of the near end and far end speech for one caller or by creating a single new package by combining the near end raw data for one caller and the near end raw data for the other caller. In this way, a more reliable package may be created. This can deal with problems which may occur during a call which affect the speech quality in the call and thus may compromise the data derived from the call.

The call-plug-in 18 may also send an audio recording of the call including the contributions of both the user A and the user B to the RM engine 20 for additional analysis. This may be included in the message 26. If an audio recording is sent, the RM engine 20 incorporates a speech-to-text engine which is used to convert the recording into textual form and then the spoken words are analysed rather than the prosody content of the speech. In this case, the data package may contain a time log of which user was speaking at which point so that the RM engine 20 can merge the time log information with the spoken word information in order to assign content of the call to the respective parties.

In another embodiment of the invention, speech characteristics are extracted and analysed in the network rather than in the mobile terminal 12. The network is capable of handling both sides the call and to extract the speech characteristics in respect of each user. In a network-extraction based embodiment, the mobile terminal does not need to contain a call plug-in 18 although it may contain an application which is used to receive network created relation parameters in order to generate a relational indicator on a display of the mobile terminal 12 as is described later on. According to this embodiment, during the call, a mobile switching centre server (MSS) handling the call creates a call leg towards a third subscriber number which connects to a recording device is able to record the call and extract the speech characteristics and send extracted/processed data to the RM engine 20 for additional analysis. In one embodiment the speech characteristics are extracted in a media gateway. In such a case, it is advantageous that user plane data goes through it. In such a case, it needs specific extensions to receive commands for the extraction of characteristics. In another embodiment, they are extracted in an intelligent voice mailbox. In any event, the RM engine receives the data package from a network element for it to carry out further data analysis.

In a network-based extraction embodiment, it is necessary to identify which party is speaking during the course of the call. If this is done in a network element which is participating in setting up and maintaining the call, this is relatively straightforward. Alternatively, if this identification operation is being carried out on a recording of the call, some relevant processing is required. In a preferred embodiment, a relevant network element such as the recording device partitions the speech signal space into a number of subspaces corresponding to the number of parties in the call. In this case, there are two parties although there may be more than two, for example if the call is a conference call. The call is partitioned into equal time slots and partition matching is performed for each of the time slots in which speech contained therein is compared against known speech characteristics of each of the parties to identify the speaker and thus assign the speech into the relevant subspace. For time slots, the characteristics of which do not match known speech characteristics of either of the parties, it is assumed that more than one party was speaking.

The RM engine 20 translates the speech characteristics contained in the data package into speech processed information. This can be done in a number of ways:

1) The pitch of the users' speech in the call in terms of its absolute value or relative value is compared to the longterm average pitch of the users' speech over a defined period (it may be a long-term average pitch based on historical data of weeks or months) and a deviation from the long-term average pitch is taken as an indicator of emotion, for example a higher pitch than average might suggest an aroused emotional state.

2) The speech-to-silence ratio is analysed and a low ratio can indicate a number of things including:
 the users being deliberate in their thoughts (for example taking a long time to think before answering difficult questions); and
 tiredness.

3) The frequency of speakers switching in the call. When there is a high rate of exchange from one speaker speaking to the other speaker speaking, this can indicate excitement and/or a high degree of engagement in the telephone conversation.

4) The ratio of the total amounts of time during which each user spends speaking in the call divided by the length of the call. This indicates the symmetry or asymmetry of the relationship between the users.

When there are a number of possible indications suggested by one particular extracted speech characteristic, a number of the extracted speech characteristics may be correlated together in order to determine the most likely indication. For example, in the case of the low speech-to-silence ratio if, in addition, the pitch is lower than average, this is taken to indicate tiredness.

Figure 2:
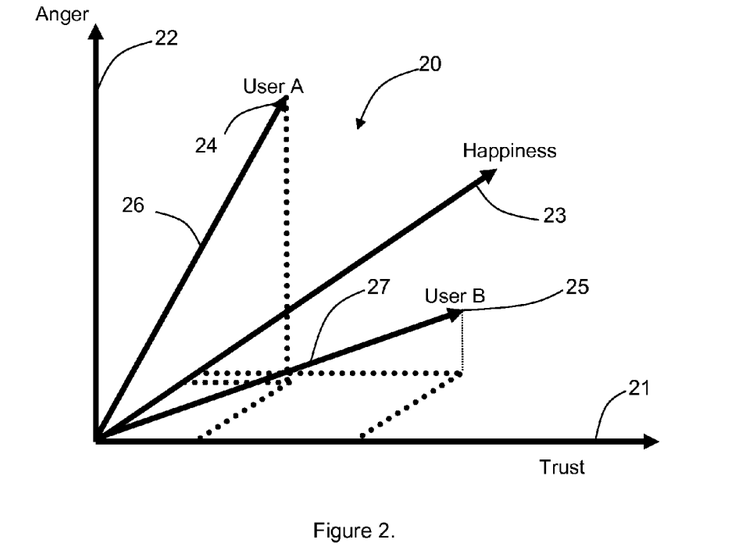
FIG. 2 shows relation parameters of two parties specified as occupying a spatial position within a three-dimensional coordinate system.

The RM engine 20 uses the speech processed information to generate in relation to each user a set of "relation parameters". In one embodiment of the invention, these are "trust", "anger", and "happiness" which, taken together, provide one representation of the emotional content of the call in respect of one user's emotional state when communicating with the other user and vice versa. In this case, because there is a set of three parameters for each user, they can be specified as occupying a spatial position within a three-dimensional coordinate system. FIG. 2 shows such a coordinate system 20 in which the axes of "trust" 21, "anger" 22, and "happiness" 23 are shown together with spatial positions 24, 25 for relation parameters of the two parties shown as respective vectors. In this case, the coordinate system 20 is representative of the telecommunications event. However, such a presentation may equally be used in relation to averages of the relation parameters for a number of telecommunications events over a period of time.

It should be noted that the relation parameters are automatically determined and are not user-selected.

The spatial position of each party represents that party's overall emotional state. Although in this Figure it is represented as a vector 26, 27 and a set of coordinates in a three-dimensional space 24, 25, it can be presented in other ways as will be described in the following.

The RM engine 20 provides primary data, which may include the extracted speech parameters, a user's average pitch; statistics related to length and frequency of speech/silence periods for the users, and statistics on frequency of speakers switching in the call in a message 28, to the event database 22 where they are stored. This is a record, in terms of primary data, of the telecommunications event in respect of both parties. The RM engine 20 provides the set of "relation parameters" in a message 30 to the mood database 24 where they are stored. This is a record, in terms of relation parameters, of the telecommunications event in respect of both parties. The mood database 24 stores the relation parameters related to the call with relation parameters related to previous calls and in this way has a data store of sets of respective relation parameters over a period of time. Although in this embodiment of the invention, the event database 22 and the mood database 24 are described as separate entities, in another embodiment they may be merged into a single database.

Since the event database 22 stores primary data of a number of telecommunications events over a period of time, data refated to these are available to be provided to the RM engine (sent in the form of an exchange of messages 32) so it can use them to generate the relation parameters which are based on historical data. For example, the event database 22 can provide the long-term pitch data used in the calculation 1) in the foregoing. Equally, any of the data available in the event database 22 can be used in the calculations 2) to 4) above for situations in which they are based on information derivable from the telecommunications event and historical data rather than being solely based on information derivable from the telecommunications event. In addition, the RM engine 20 is able to request the mood database 24 to provide it with relation parameter information, for example current and past information, and manipulate the relation parameter information to provide additional information, for example evolution of relation parameters, and thus the relationship between the parties, over time. This may include the operation of averaging the relation parameters over a period, or over periods, of time. It should be understood that such operations can take place either during, before, or after telecommunications events.

As mentioned in the foregoing, the mobile terminal 12 also includes the SMS plug-in module 16. This operates in respect of incoming and outgoing SMS messages in conjunction with network elements in a way which corresponds to that of the call plug-in 18. For example, the SMS plug-in 16 analyses the content of SMS messages and extracts various text-based characteristics including the presence of certain keywords and the frequency of use of certain keywords and sends these in the form of a data package to the RM engine 20 in a message 34. The SMS plug-in 16 may also send copies of SMS messages to the RM engine 20, although it may be preferred that during its transmission the SMS message may be sent to the RM engine 20 by a network element such as a messaging centre. The RM engine 20 sends event-related information to the event database 22 in a message 36. Different words may be classified as signifying different levels of emotion and in generating relation parameters, numerical weights can be assigned to various words reflecting to the emotional "power" of them. Numerical weighting can be adjusted in time as a function of the user's word usage. If a user uses a word signifying emotion frequently, the weight of this world in the emotion evaluation of the user is decreased in time.

It should be noted that although the analysis of SMS messages may be done message by message, it may be desired to analysis groups of related SMS messages, for example an exchange of SMS messages, referred to as a thread. In the case of callbased analysis, the start and end points of a telecommunications event are clear. In the case of SMS message-based analysis, the start and end points of an exchange of thread may be less clear and therefore heuristics may be applied to determine its start and end points before the primary data are generated for storage in the event database 22 and relation parameters are generated for storage in the mood database 24.

In common with call-based analysis, SMS message based-analysis may also be network-based rather than terminal-based. In such an embodiment, when an SMS message is sent, an MSS serving the mobile originating user forwards the content of the SMS message to the RM engine 20. In a situation in the mobile originating user is not a user of the service, the content of the SMS message is forwarded by an MSS serving the mobile terminating user. Whether a user has arranged to use the service is checked by the relevant MSS at the time when the SMS message is sent or received. Generally, if there is a choice, it is preferred to have the SMS message content sent by the MSS serving the mobile originating user to avoid problems by the SMS message getting lost on route.

As an alternative to using an MSS to forward the content of the SMS message to the RM engine 20, the system may be configured to set up originating services, for example those supported by CAMEL (Customised Application for Mobile Enhanced network Logic) and having a copy of the SMS extracted using service control point (SCP) functionality.

In addition to, or instead of, SMS analysis, the invention may be configured to operate on instant messaging sessions. Such sessions may be easier to prepare for analysis than SMS threads because it is not necessary to analyse whether or not a particular message was part of a session. The types of analysis applied to instant messaging sessions would correspond to those applied to analyse SMS threads.

Accordingly, looking at both call-analysis and SMS message-analysis embodiments of the invention, there is:

(i) a one-way flow of event-related information (messages 28) from the RM engine to the event database for the purpose of storing event information in the event database 22; and (ii) a bi-directional exchange of information (messages 32) between the RM engine 20 and the event database 22 for the purposes of generating relation parameters based on past event information, updating/merging information, and the creation and storage of statistics in the event database 22. The messages can be transferred in the background when there is no telecommunications event ongoing.

At this point, the mood database 24 contains the set of relation parameters derived for the telecommunications event. In a preferred embodiment of the invention, the mood database 24 stores a number of such sets derived from a number of telecommunications events. The mood database 24 contains respective sets of relation parameters in respect of individual telecommunications events for all of the users of the service. Associated with each event is the other party to the telecommunication event. Accordingly, when as a result of a look-up request, a particular telecommunication event in respect of a user is inspected in order to access the set of relation parameters, knowledge of the time and nature of the telecommunication event and the other party can enable the set of relation parameters for the other party to be accessed. As a result, in respect of individual telecommunications events, pairs of sets of relation parameters can be accessed. The mood database 24 may also be queried in order to provide sets of relation parameters between two particular parties for all of their telecommunications events in common or for their telecommunications events in common over a defined period.

In addition, the mood database 24 may also contain a long-term average of sets, for example the average of sets going back from the most recent telecommunications event to a defined point in the past and/or the average of sets over a defined time period in the past for one defined party in respect of another defined party. These time periods may be defaults or may be have been configured at the request of the user of the mobile terminal 12. Such longer term statistics are calculated by using via weighed averages of telecommunications events over the time period of interest.

In a "push" embodiment the system 10 operates to download periodically the sets of the relation parameters to the mobile terminal 12 which relate to the user of the mobile terminal 12, both in terms of the user towards the contacts and the contacts towards the user. In a preferred embodiment, the RM engine 20 contains a list of the contacts corresponding to the contacts list in the mobile terminal 12 and it accesses this list, determines for which contacts relation information is present in respect of the user A and is marked as being available to be provided on request, and then instructs the RM engine 20 to interrogate the mood database 24 to send relation parameters which correspond to the user-contacts relationships (that is pairs of sets of relation parameters) to the mobile terminal 12. Alternatively, the system can be configured to operate in a "pull" mode in which the mobile terminal 12 requests that the sets of the relation parameters be sent to it. This may be an automatic periodic activity, it may be triggered by a user request, or it may be triggered by some other event.

Irrespective of whether the system 10 is embodied as a "push" or a "pull" embodiment, pairs of sets of relation parameters are sent by the RM engine 20 to the mobile terminal 12 which as a result then contains information representing the emotional state of the user of the mobile terminal 12 towards individual ones of contacts in the contacts list and vice versa. Accordingly, they are available to be incorporated into the set of data held for the specific contact(s) in the contacts list, so that the mobile terminal 12 can create the relational indicator so that it can be made available to the user A.

It will be appreciated that not all users of a telecommunications system would choose to use a service which enables a relational indicator which is representative of them to appear on another user's mobile terminal. Therefore, permission must specifically be given by users for the steps to be taken which are involved in generating the relational indicator. It may be activated by users as an originating service and setting up the service may provide the permission.

Therefore, it will be understood that in relation to a telecommunications event, content characteristics are extracted during the course of the event (or afterwards if derived from a recording of the event), and then at some point, or at various points, after the event has finished, processed information and relation parameters are generated in the RM engine 20, and the processed information is transferred to the event database and the relation parameters are transferred to the mood database 24. Periodically, either at the instigation of the mobile terminal 12 or the RM engine 20 (or an entity controlling it), the relation parameters representing the current emotional state of the user to the contact and vice versa, are transferred to the mobile terminal 12 so that the relational indicator representative of the combined emotional state, that is the relationship, can be incorporated into the set of data held for the contact, so that it can be accessed by the user.

Figure 3:
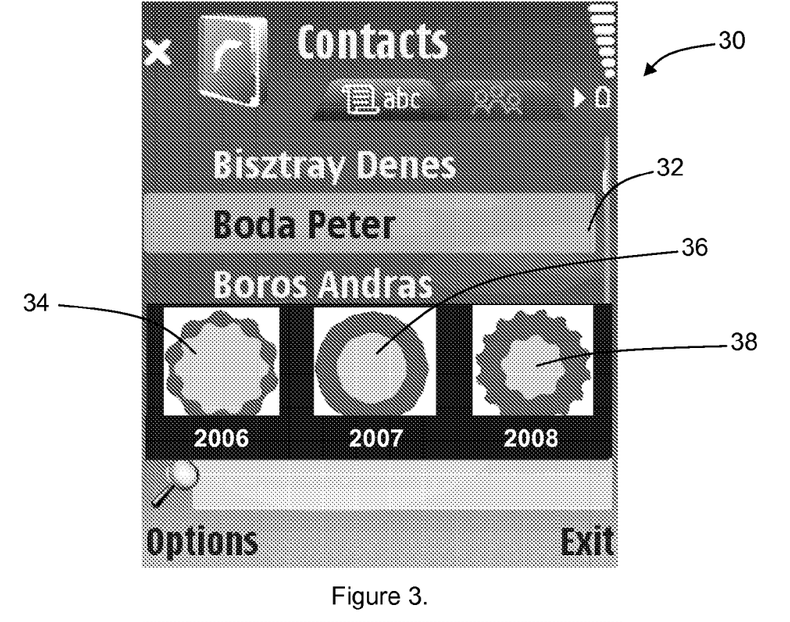
FIG. 3 shows a user interface including relational indicators varying over time.

FIG. 3 shows a view of a user interface 30 including relational indicators varying over time. In this case, for a particular contact "Peter Boda" 32 relational indicators for the preceding years 2006, 2007, and 2008 (respectively 34, 36, 38) are presented when that contact is highlighted. Highlighting of other contacts would cause their historical relational indicators to be presented. Other information can be made available. For example, a current relational indicator could be shown for the recent past, covering the past week, the past month, or the past six months.

Figure 4:
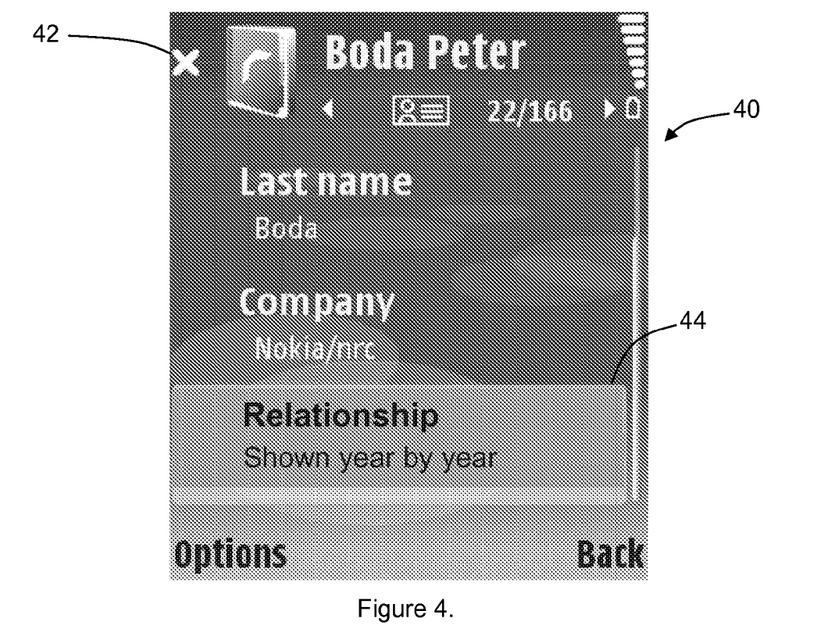
FIG. 4 shows another user interface.

FIG. 4 shows a different view 40 of the user interface of FIG. 3. In this case, it shows that among the items associated with a contact 42 in a contacts list is a user-configurable item 44 which controls how the relational indicators are presented in relation to a contact, that is according to FIG. 3. In this case, the user has elected to have the relationship between himself and the contact in a "year by year" presentation which is the one shown in FIG. 3.

However, it is not necessary for the invention to be implemented as part of a contacts list and it may be embodied in the form of a standalone application. For example, such an application could provide relational indicators contact by contact according to the user's request.

FIGS. 5 to 8 show overall emotional states for two parties combined into a relational indicator 50 in the form of a single graphical form 51 including two relational sub-indicators 52, 53. This is a representation of the data which have been generated indicating the emotional states of each of the parties during their interaction in a telecommunications event. In these Figures, the generated relation parameters "trust" 54, "anger" 55, and "happiness" 56 of each of the parties are present on the right hand side, with those of one party 57 disposed above and those of another party 58 disposed below. The values generated in respect of each of the relation parameters for each party are represented by a bar which slides along a scale according the associated relation parameter value. On the left hand side, the relational indicator, derived from the relation parameter values, can be seen.

In one embodiment of the invention, the nature of the relational indicator changes according to the values of the relation parameters "trust", "anger", and "happiness". An inner shape is representative of the user. An outer shape is representative of the contact. The appearance these shapes varies in a number of respects, particularly, (i) deviation from a pure circle towards a shape having a waveform periphery;

(ii) the wavelength of the waveform periphery;

(iii) the smoothness of the waveform periphery going from a smooth sinusoidal-type waveform to a more jagged or spiky waveform;
(iv) the pulsing (a repeating cycle of expansion and contraction) of the shapes in terms of the frequency or beat of the pulse;
(v) the sense of rotation of the waveform periphery in a circumferential direction either clockwise or anticlockwise; and
(vi) the speed of rotation of the waveform periphery in a circumferential direction.

As will be appreciated, the shapes are animated in order to give the impression of them pulsing and rotating.

One example is now described in the following.

A higher value of "trust" for one of the parties corresponds to presentation of a shape having:
(i) a degree of waveform in its periphery;
(ii) a moderate wavelength of the waveform periphery;
(iii) a smooth sinusoidal-type waveform periphery;
(iv) a relatively slow pulsing;
(v) anticlockwise rotation; and
(vi) a slow speed of rotation.

A higher value of "anger" for one of the parties corresponds to presentation of a shape having:
(i) a degree of waveform in its periphery;
(ii) a small wavelength of the waveform periphery;
(iii) a jagged or spiky waveform waveform periphery;
(iv) a relatively rapid pulsing;
(v) clockwise rotation; and
(vi) a fast speed of rotation.

A higher value of "happiness" for one of the parties corresponds to presentation of a shape having:
(i) a degree of waveform in its periphery;
(ii) a large wavelength of the waveform periphery;
(iii) a smooth sinusoidal-type waveform periphery;
(iv) a moderate pulsing;
(v) anticlockwise rotation; and
(vi) a moderate speed of rotation.

In a preferred embodiment of the invention, the shapes are not solely dependent on respective sets of relation parameters. The shape which relate to one user may be generated based on relation parameters of the other users. For example, the closer the relation parameters are, for example in terms of a combination of the differences between respective pairs of corresponding relation parameters, then the closer synchronisation there is to any apparent movement (pulsing or rotating). A small difference may lead to apparent movement being in-phase or close to in-phase. A large difference may lead to apparent movement being anti-phase.

There are many possible variations which can be applied. For example, a variation in the amplitude of the waveform or the relative sizes of the shapes and the changes of their relative sizes (for example the maximum and minimum sizes of the shapes during pulsing) could provide an indication of the relationship between parties.

Figure 5:
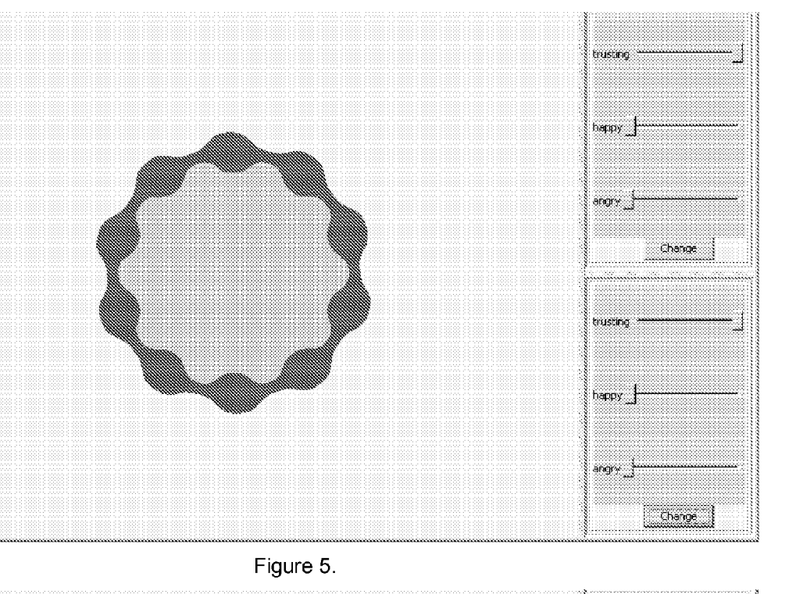
FIG. 5 shows a first relational indicator.

FIG. 5 shows a relational indicator in which both parties have a high level of trust toward each other. In this case, in addition to each shape having the characteristics mentioned above, they pulse in synchronisation, and rotate anti-clockwise at the same speed.

Figure 6:
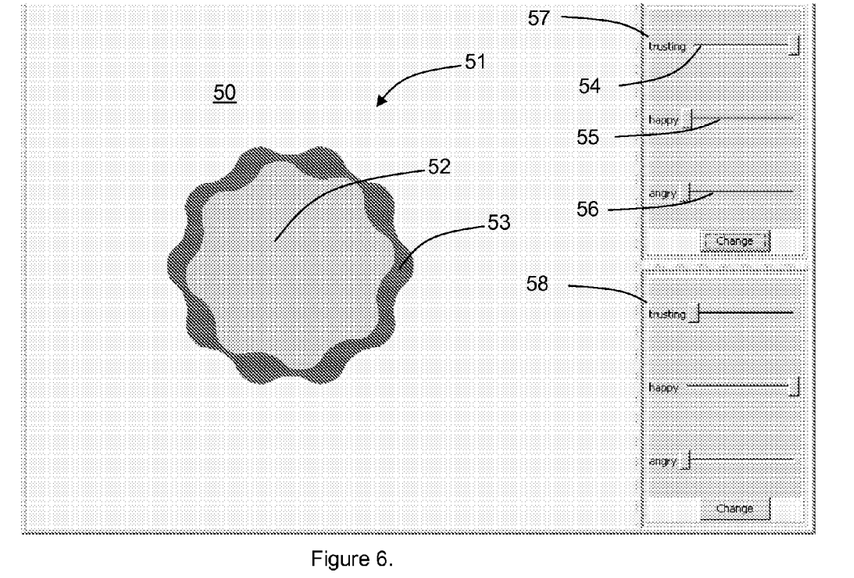
FIG. 6 shows a second relational indicator.

FIG. 6 shows a relational indicator in which one party has a high level of trust and the other has a high level of happiness. In this case, in addition to each shape having the characteristics mentioned above, they do not pulse in synchronisation, the inner shape pulses more quickly and they rotate anticlockwise at different speeds.

Figure 7:
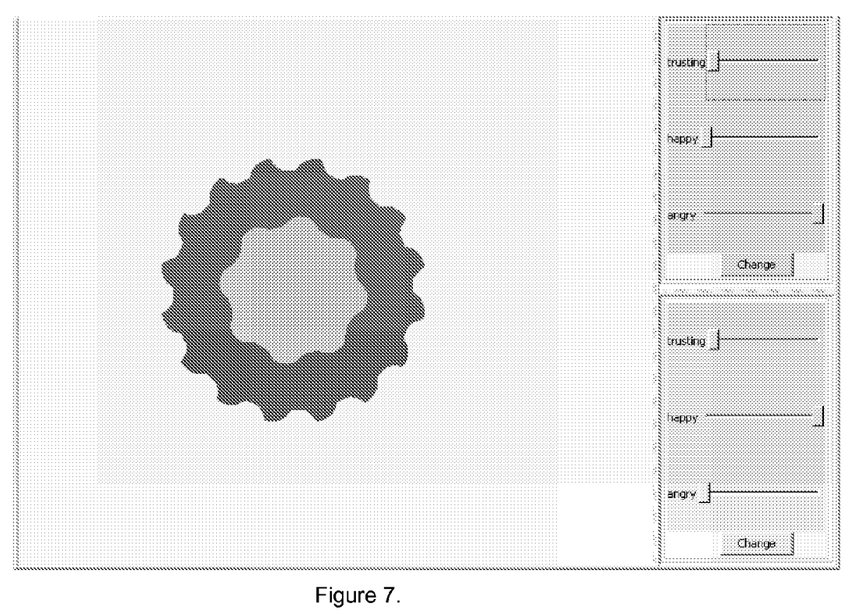
FIG. 7 shows a third relational indicator.

FIG. 7 shows a relational indicator in which one party has a high level of anger and the other has a high level of happiness. In this case, in addition to each shape having the characteristics mentioned above, they do not pulse in synchronisation, the outer shape pulses more quickly and the outer shape is rotating clockwise and the inner shape rotates anticlockwise at different speeds.

Figure 8:
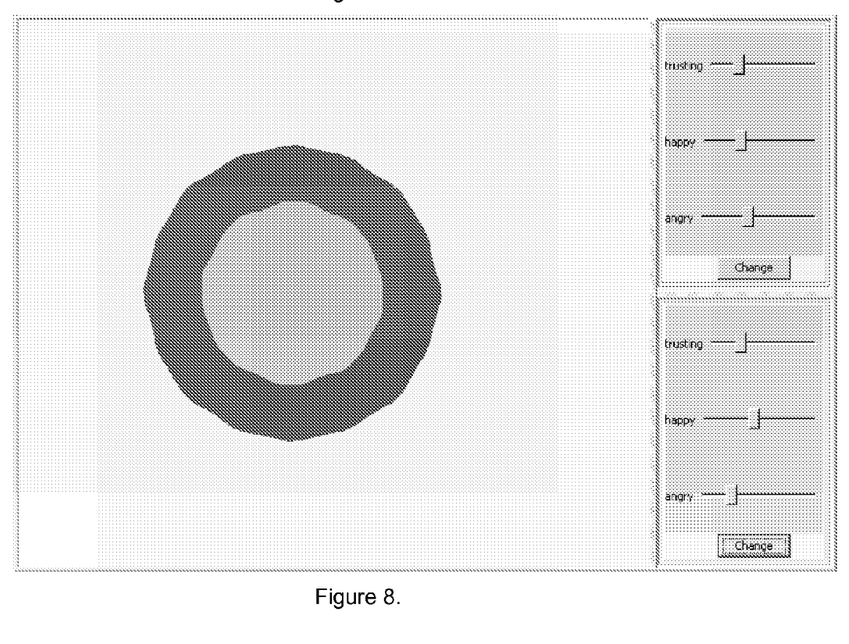
FIG. 8 shows a fourth relational indicator.

FIG. 8 shows a relational indicator in which both parties have generally mid-level values for all of the relation parameters. In this case, they are pulsing generally in synchronization, and rotating slowly anticlockwise at the same speed.

By generating a relational indicator which includes processed data in terms of one party's view of the other and vice versa, this deals with the issue that emotional relations between two parties are usually not symmetrical. In addition to this, it may provide information about a contact which may not have been apparent to the user.

The invention may be configured to operate in different ways. The mood database 24 may contain sets of relation parameters in respect of a number of telecommunications events. Rather than providing (or processing) such sets which are available in respect of a particular other user, all of the sets together may be taken to represent the user A's overall emotional state, for example over a defined time period of defined time periods. Such an overall state may be generally independent of particular telecommunications events and other users. This information may be used in a number of ways. It may be provided to the user A so that they can assess the general change in their own state, for example whether their emotional state towards one person compares with their emotional state on average towards a number of people. Alternatively, or additionally, it can be incorporated into the generation of the relational indicator for another user so that this is not exclusively governed by the relation parameters between the user A and this other user but is also modified by the overall state of the user A as recorded in terms of sets of relation parameters as they apply to all users for which they have been recorded in the mood database 24.

It may be possible for a user to be provided with such data which relate to a contact of that user. In this way, the user may see how the contact's emotional state towards the user compares with the contact's emotional state towards individual third parties, or towards third parties in general (that is on average).

In other embodiments, analysis of the content characteristics can be enhanced by using additional information, for example the age and sex of the users. The additional information may be contained in profiles of the parties which is accessible to the RM engine 20.

In another embodiment of the invention, other aspects of telecommunications events could be used in the generation of the relation parameters such as the number of calls or the number of SMS messages, and the times at which calls were made or SMS messages sent, such as whether this was within work hours, outside of work hours, or late at night.

In the foregoing, embodiments have been described in which some processing occurs in the mobile terminal 12 and some occurs in the RM engine 20. However, in another embodiment all of the processing necessary to produce a relational indicator takes place in a mobile terminal and the relation parameters thus generated are stored locally in that mobile terminal. Accordingly, the mobile terminal at the each end of a call will generate and store its own processed data in relation to the call.

A benefit provided by the invention is that it operates in an objective manner based on analysis of characteristics present in speech (and also present in text-based media). This means that it is possible to detect, and provide information in relation to, emotional states of an individual with whom a user of a terminal device is in communication with which might not be apparent to, or might be missed by, the user. For example the user might be pre-occupied, or too busy, to notice such an emotional state.

Although the invention has been described in terms of mobile telecommunications, it is not so restricted and may also apply to fixed telecommunications systems and networks. In such a case, fixed terminals are used having a display capability suitable to present the relational indicator. They may also be provided with contact lists to provide a useful context within which it is presented to a user.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of generating a relational indicator based on analysis of at least one telecommunications event between a first party and a second party, comprising the steps of:
   extracting first content characteristics from the at least one telecommunications event and processing them to produce a first relation parameter;
   extracting second content characteristics from the at least one telecommunications event and processing them to produce a second relation parameter;
   using the first and second relation parameters to generate the relational indicator;
   analyzing the extracted first and second content characteristics at a first location of the first party;
   analyzing the extracted first and second content characteristics at a second location of the second party; and
   comparing, the analysis of the first and second content characteristics extracted at the first location of the first party, to the analysis of the first and second content characteristics extracted at the second location of the second party, to generate additional information regarding the at least one telecommunications event,
   wherein one of the extracted first content characteristics or second content characteristics is associated with word usage and assigned numerical weights that are adjusted in time as a function of the first party or the second party's word usage.

2. A method according to claim 1 in which the relation parameters are derived from a plurality of telecommunications events between the first party and the second party over a period of time.

3. A method according to claim 1 in which a set of sequential relational indicators are generated so that the development of a relationship between the parties over a period of time is indicated.

4. A method according to claim 3 in which the set of sequential relational indicators indicate states of the relationship covering discrete periods in the past.

5. A method according to claim 1 in which three relation parameters are generated.

6. A method according to claim 1 in which the first and second content characteristics are extracted within a first network element.

7. A method according to claim 6 in which the first network element is a media gateway.

8. A method according to claim 6 in which the first network element is an intelligent voice mailbox.

9. A method according to claim 6 in which the first network element passes the first and second content characteristics on to a second network element which produces the relation parameters.

10. A method according to claim 6 in which the first network element is a relationship management engine.

11. A method according to claim 1 in which the first and second content characteristics are extracted within the terminal device.

12. A method according to claim 11 in which the terminal device is a mobile terminal device.

13. A method according to claim 11 in which the terminal device sends the extracted content characteristics to a network element to produce the relation parameters.

14. A method according to claim 1 in which the first party is a user of the terminal device containing a contacts list.

15. A method according to claim 14 in which the contacts list contains a contact representing the second party.

16. A method according to claim 15 in which the relational indicator is displayed at the terminal device in association with the contact.

17. A method according to claim 1 in which the telecommunications event is a voice call between the first party and the second party.

18. A method according to claim 1 in which the telecommunications event is a text-based message from one party to another.

19. A system for generating a relational indicator based on analysis of at least one telecommunications event between a first party and a second party, comprising:
   a relation management engine configured to process first content characteristics extracted from the at least one telecommunications event to produce a first relation parameter and to process second content characteristics extracted from the at least one telecommunications event to produce a second relation parameter; and
   a terminal device configured to use the first and second relation parameters to generate the relational indicator,
   wherein the relation management engine is further configured to:
   analyze the extracted first and second content characteristics, at a first location of the first party,
   analyze the extracted first and second content characteristics at a second location of the second party, and
   compare, the analysis of the first and second content characteristics extracted at the first location of the first party, to the analysis of the first and second content characteristics extracted at the second location of the second party, to generate additional information regarding the at least one telecommunications event,
   wherein one of the extracted first content characteristics or second content characteristics is associated with word usage and assigned numerical weights that are adjusted in time as a function of the first party or the second party's word usage.

20. A network element configured to generate first and second relation parameters to be provided to a terminal device which is configured to use the first and second relation parameters to generate a relational indicator, the network element being also configured to process first content characteristics extracted from at least one telecommunications event to produce the first relation parameter and to process second content characteristics extracted from the at least one telecommunications event to produce the second relation parameter, the network element being further configured to:

analyze the extracted first and second content characteristics at a first location of the first party, analyze the extracted first and second content characteristics at a second location of the second party, compare, the analysis of the first and second content characteristics extracted at the first location of the first party, to the analysis of the first and second content characteristics extracted at the second location of the second party, to generate additional information regarding the at least one telecommunications event, and transmit the additional information to the terminal device, wherein one of the extracted first content characteristics or second content characteristics is associated with word usage and assigned numerical weights that are adjusted in time as a function of the first party or the second party's word usage.

21. A terminal configured to receive first and second relation parameters from a network element and to use the first and second relation parameters to generate a relational indicator, the first relation parameter having been produced as a result of processing by the network element of first content characteristics extracted from at least one telecommunications event and the second relation parameter having been produced as a result of processing by the network element of second content characteristics extracted from the at least one telecommunications event, the terminal also configured to receive additional information regarding the at least one telecommunications event, the additional information generated from comparing an analysis of the first and second content characteristics extracted at a first location of the first party, to an analysis of the first and second content characteristics extracted at a second location of the second party, wherein one of the extracted first content characteristics or second content characteristics is associated with word usage and assigned numerical weights that are adjusted in time as a function of the first party or the second party's word usage.

22. A non-transitory computer readable medium having instructions stored thereon which, when executed on a computing system, cause the computer system to carry out a method of generating a relational indicator based on analysis of at least one telecommunications event between a first party and a second party, the method comprising the steps of:

extracting first content characteristics from the at least one telecommunications event and processing them to produce a first relation parameter;

extracting second content characteristics from the at least one telecommunications event and processing them to produce a second relation parameter;

using the first and second relation parameters to generate the relational indicator;

analyzing the extracted first and second content characteristics at a first location of the first party;

analyzing the extracted first and second content characteristics at a second location of the second party; and comparing, the analysis of the first and second content characteristics extracted at the first location of the first party, to the analysis of the first and second content characteristics extracted at the second location of the second party, to generate additional information regarding the at least one telecommunications event, wherein one of the extracted first content characteristics or second content characteristics is associated with word usage and assigned numerical weights that are adjusted in time as a function of the first party or the second party's word usage.

23. The method of claim 1, further comprising using the additional information for assessing reliability of the analysis of the at least one telecommunications event and for eliminating effects of a bad connection quality or communication style of a remote party.

24. The system of claim 19, wherein the relation management engine is further configured to use the additional information for assessing reliability of the analysis of the at least one telecommunications event and for eliminating effects of a bad connection quality or communication style of a remote party.

25. The network element of claim 20, wherein the network element is further configured to use the additional information for assessing reliability of the analysis of the at least one telecommunications event and for eliminating effects of a bad connection quality or communication style of a remote party.

26. The terminal of claim 21, wherein the terminal is further configured to use the additional information for assessing reliability of the analysis of the at least one telecommunications event and for eliminating effects of a bad connection quality or communication style of a remote party.

27. The non-transitory computer readable medium of claim 22, wherein the method further comprises using the additional information for assessing reliability of the analysis of the at least one telecommunications event and for eliminating effects of a bad connection quality or communication style of a remote party.

* * * * *